UNITED STATES PATENT OFFICE.

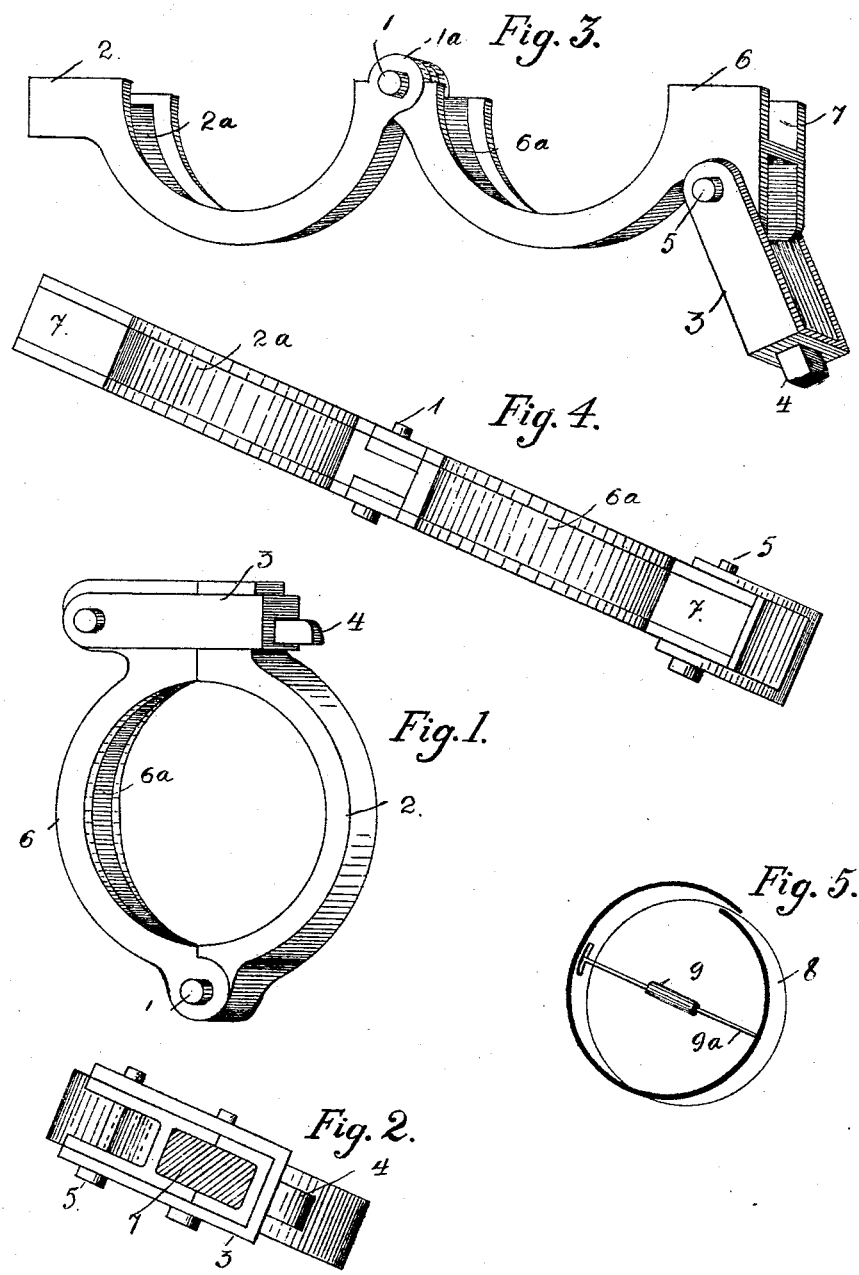

WINFIELD STEINER SIGLER, OF SAN PEDRO, MEXICO.

APPARATUS FOR JOINTING PIPES.

940,562.  Specification of Letters Patent.  Patented Nov. 16, 1909.

Application filed November 2, 1908. Serial No. 460,771.

*To all whom it may concern:*

Be it known that I, WINFIELD STEINER SIGLER, a citizen of the United States of America, residing at San Pedro, Federal District of Mexico, Mexico, have invented certain new and useful Improvements in Apparatus for Jointing Pipes, of which the following is a specification.

My invention aims to produce watertight and lasting joints between the ends of pipes made of concrete, cement, clay, any argillacious material, or asphaltum and bitumen. Hitherto it has been customary to make such joints with male and female coupling ends, one pipe having a large flaring-out end forming the female portion, which entailed increased cost of manufacture, and prevented the use of pipes of uniform external diameter throughout. Or the joints were made by collars "sweated" to one pipe section end and united to the other by inserting between the collar and the male end of the joint moist cementing material. This method frequently gave rise to leakage. By means of the present process and apparatus pipe sections of uniform external diameter throughout are connected by a material similar to or identical with that of the pipe walls, disposed so as to form with the walls an integral structure, and to be readily and cheaply applied. These objects I attain by the process herein below fully described and by the apparatus illustrated in the accompanying drawing in which:

Figure 1 is a perspective view of my new jointing mold as closed; Fig. 2, a top plan view of the same; Fig. 3, a perspective view of the mold opened; Fig. 4, a top plan view of the mold shown in Fig. 3, and Fig. 5 is a perspective view of the adjustable circular liner.

The mold, Fig. 1, of wood or other suitable material, preferably metal is composed of two semi-circular halves, 2 and 6, each of which has formed on its internal face a semicircular recess, $2^a$, $6^a$, preferably of square section, having an internal diameter equal to the external diameter of the pipes to be jointed, and a depth equal to the desired thickness of the union collar. The width of said recess determines the width of the union-collar as the recess forms with the exterior walls of the pipes the mold for said collar. This width will vary with the diameter and the thickness of walls of the pipes and the pressure to which they may be subjected. The two semi-circular halves are connected at the bottom by a hinge-joint $1^a$, having male and female members connected by the hinge pin 1. At the opposite or top end each half carries integral with it a widened portion of rectangular section having an internal channel 7 open at the top and continuous with the recess $2^a$ and $6^a$ respectively. The two widened portions may be locked together by the hinged stirrup-piece 3, swinging on the hinge pin 5, journaled in the widened portion of half 2, and engaging in the locked position the widened portion of half 6, suitably formed to a rectangular cross-section for this purpose. Handle 4, projecting from the engaging end of stirrup-piece 3, facilitates the locking and unlocking of said piece.

When circumstances permit it is preferable to form the joint between the pipe-sections before they have become entirely set, but after they have become hard enough to stand handling without local deformation. But perfectly tight and reliable joints are made even after the pipes have become thoroughly set. The two pipes to be joined are placed end to end and in line. To prevent any of the jointing material from working through the circular crack or opening between the pipe ends and clogging the interior of the pipe this opening is entirely closed as regards the interior of the pipe by setting out against its circular bottom the expansible liner 8, by means of the turnbuckle 9 connecting the two parts of the diametrically extending tension-rod $9^a$. This expansible liner is a sleeve circular in section, of elastic metal split parallel to its axis, allowing the edges of the split to lap over each other so as to permit of changes of diameter of the sleeve according to the distention of the rod $9^a$. Thereupon the mold is clasped around the pipe so that the circular junction line or crack between their ends comes midway between the lateral faces of the mold, and the latter is locked in this position by clamping down the stirrup-piece 3. Suitably moistened binding material, preferably of the same character as that of the pipe walls is now introduced into the recess $2^a$, $6^a$, through the entrance channels 7, 7. This material is duly tamped down until the entire recess is filled. As soon as the material has set hard the mold is removed by an obvious manipulation, leaving a collar of binding material which has, along its inner surface become incorporated with the material of the pipe walls, forming an absolutely impermeable and durable joint. The expansible liner 8 is removed from the inside of the pipes by slacking up the turnbuckle and withdrawing the liner.

It is to be noted that in this process the binding material will work itself into any openings there may be in the end-joint between the contiguous pipe-ends, and will there set to form an end-packing.

I attach especial importance to the provision for preventing any of the cementing material used for the joint from penetrating into the interior of the pipes to be jointed, as in processes of this nature it is common to allow the jointing material to intrude into the interior of the pipes, thereby reducing their effective diameter.

I claim:

1. A mold for joining the ends of pipes including an expansible and contractible member which conformably engages on the inner circumference of the pipe ends so as to extend on opposite sides of the line of juncture between the pipe ends, and a mold proper which conformably engages about the periphery of the pipe ends and which is formed with a groove which extends on opposit sides of the line of juncture between the pipe ends.

2. A mold for joining the ends of pipes including an expansible and contractible member which conformably engages on the inner circumference of the pipe ends so as to extend on opposite sides of the line of juncture between the pipe ends, and a mold proper which conformably engages about the periphery of the pipe ends and which is formed with a groove, which extends on opposite sides of the line of juncture between the pipe ends, means whereby the ends of pipes may be joined by the employment of plastic material including a split band which has its ends overlapping and which conformably engages on the inner circumference of the pipe ends so as to extend on opposite sides of the line of juncture therebetween, means whereby the diameter of said band may be increased or diminished, and a mold which conformably engages about the periphery of the pipe ends, said mold being designed to form a collar about the abutting ends of the pipe when plastic material is introduced therein.

In testimony whereof I affix my signature in presence of two witnesses.

WINFIELD STEINER SIGLER.

Witnesses:
J. GRANDJEAN,
JOSÉ MATA.